US008965869B2

(12) United States Patent
Rosado et al.

(10) Patent No.: US 8,965,869 B2
(45) Date of Patent: Feb. 24, 2015

(54) SYSTEMS AND METHODS FOR GENERATING A WEB PAGE BASED ON SEARCH TERM POPULARITY DATA

(75) Inventors: Gonzalo Diego Rosado, Buenos Aires (AR); Douglas Suarez, Miami, FL (US); Jose Andres Gonzalez, Miami, FL (US); Nicolas Scafuro, Miami, FL (US); Maria Jose Rodriguez, Miami, FL (US)

(73) Assignee: Yahoo! Inc., Sunnyvale, CA (US)

( * ) Notice: Subject to any disclaimer, the term of this patent is extended or adjusted under 35 U.S.C. 154(b) by 1192 days.

(21) Appl. No.: 12/465,599

(22) Filed: May 13, 2009

(65) Prior Publication Data

US 2010/0293185 A1 Nov. 18, 2010

(51) Int. Cl.
*G06F 7/00* (2006.01)
*G06F 17/30* (2006.01)

(52) U.S. Cl.
CPC .................................. *G06F 17/3089* (2013.01)
USPC ........................................ 707/706; 707/748

(58) Field of Classification Search
CPC ....................... G06F 17/30737; G06F 17/3089
USPC ........................................................ 707/706
See application file for complete search history.

(56) References Cited

U.S. PATENT DOCUMENTS

| 2002/0089516 | A1* | 7/2002 | Sobol ............................ 345/620 |
| 2002/0184212 | A1* | 12/2002 | Ugai et al. ........................ 707/6 |
| 2006/0036949 | A1* | 2/2006 | Moore et al. ................... 715/730 |
| 2007/0038624 | A1* | 2/2007 | Choi et al. ......................... 707/5 |
| 2007/0156757 | A1* | 7/2007 | Tang et al. .................. 707/104.1 |
| 2008/0071929 | A1* | 3/2008 | Motte et al. ................... 709/246 |
| 2008/0209351 | A1* | 8/2008 | Macadaan et al. ............ 715/762 |
| 2009/0077062 | A1* | 3/2009 | Spivack et al. .................... 707/5 |
| 2009/0182727 | A1* | 7/2009 | Majko .............................. 707/5 |
| 2009/0182770 | A1* | 7/2009 | Madhavan ................ 707/103 R |

* cited by examiner

*Primary Examiner* — Rehana Perveen
*Assistant Examiner* — Huen Wong
(74) *Attorney, Agent, or Firm* — Martine Penilla Group, LLP (57) ABSTRACT

Methods and systems for displaying popular internet searches on a webpage are provided. Popularity data is received which includes a plurality of search terms, and each of the search terms has an associated popularity index. A determination is made as to whether any of the search terms is an approved term by referencing the search terms against a list of approved terms. If any of the search terms is an approved term, then that search term's corresponding entry in the list of approved terms is updated with that search term's associated popularity index. The search terms that are not approved terms define a set of unclassified search terms. The unclassified search terms are classified by updating the list of approved terms to include the unclassified search terms and their associated popularity indices. The most popular search terms in the list of approved search terms is determined based upon the popularity index. A webpage is generated including images associated with each of the most popular search terms.

20 Claims, 8 Drawing Sheets

Fig. 1

| Search Term | Popularity Index |
|---|---|
| Jill Star | 10 |
| Mary Brown | 9 |
| James Smith | 8 |
| J Smith | 7 |
| John Johnson | 6 |
| Robert Williams | 5 |
| Willie Davis | 4 |
| JS | 3 |

50

Black List

| |
|---|
| Jill Star |
| Linda White |
| Patty Thomas |

52

| Category | Image | Popularity Index | Approved Search Query Terms |
|---|---|---|---|
| Music, Celebrities | J_Johnson_img | | J Johnson |
| Sports | J_Smith_img | | J Smith |
| Sports | James_Smith_img | | James Smith |
| Music, Celebrities | John_Johnson_img | | John Johnson |
| Music | R_Williams_img | | R Williams |
| Music | Robert_Williams_img | | Robert Williams |

| Category | Image | Popularity Index | Approved Search Query Terms |
|---|---|---|---|
| Music, Celebrities | J_Johnson_img | | J Johnson |
| Sports | J_Smith_img | 7 | J Smith |
| Sports | James_Smith_img | 8 | James Smith |
| Music, Celebrities | John_Johnson_img | 6 | John Johnson |
| Music | R_Williams_img | | R Williams |
| Music | Robert_Williams_img | 5 | Robert Williams |

56

| Station List | Popularity Index |
|---|---|
| Willie Davis | 4 |
| Mary Brown | 9 |
| JS | 3 |

Black List

| |
|---|
| Willie Davis |
| Jill Star |
| Linda White |
| Patty Thomas |

56

| Station List | Popularity Index |
|---|---|
| Mary Brown | 9 |
| JS | 3 |

Fig. 2C

| Station List | Popularity Index |
|---|---|
| Mary Brown | 9 |

| Category | Image | Popularity Index | Approved Search Query Terms |
|---|---|---|---|
| Music, Celebrities | J_Johnson_img | | J Johnson |
| Sports | J_Smith_img | 7 | J Smith |
| Sports | James_Smith_img | 8 | James Smith |
| Music, Celebrities | John_Johnson_img | 6 | John Johnson |
| Sports | JS_img | 3 | JS |
| Sports | Mary_Brown_img | 9 | Mary Brown |
| Music | R_Williams_img | | R Williams |
| Music | Robert_Williams_img | 5 | Robert Williams |

SYSTEMS AND METHODS FOR GENERATING A WEB PAGE BASED ON SEARCH TERM POPULARITY DATA

BACKGROUND

1. Field of the Invention

The present invention relates to methods and systems for presenting popular internet searches.

2. Description of the Related Art

As the internet has grown, so has the importance of internet search engines as mechanisms for allowing persons accessing the internet to quickly and effectively find relevant information. A generic internet search engine typically receives inputted search queries from a user and returns results in the form of hyperlinks to relevant websites. More specialized search engines may return selected types of content, or otherwise allow customization of searches in various ways. Towards the goal of providing relevant responses to users, search engines must primarily perform the two functions of indexing internet content, and deciphering user-inputted search queries.

In order to index internet content, search engines may employ spiders, crawlers, bots, or other-termed software entities which can scour the internet in search of web-accessible content. This content is then indexed in various ways in order to categorize the relevance of the content for later retrieval. For example, this may be accomplished by storing links to the content and associating the links with key words found within the content itself. Thus, when a search query is inputted that contains recognized key words, then the stored links to content having those same key words may be retrieved and presented to the user.

In order to make search engines more user-friendly, much effort has been devoted to the development of algorithms which can better decipher user-inputted search strings. By analyzing the syntax, structure and wording of search queries, search engine developers continually refine the mechanisms by which search queries are interpreted.

Additionally, data may be derived from the body of search queries received by a search engine. It is in this context that embodiments of the invention arise.

SUMMARY

Embodiments of the present invention provide methods and systems for displaying popular internet searches. It should be appreciated that the present invention can be implemented in numerous ways, such as a process, an apparatus, a system, a device or a computer program product embodied on a computer readable medium. Several inventive embodiments of the present invention are described below.

In one embodiment, a method for displaying popular internet searches on a webpage is provided. According to the method, popularity data is received. The popularity data includes a plurality of search terms, and each of the search terms has an associated popularity index. The popularity index for a given search term is based upon a measure of a rate of change in a number of search queries for the given search term. A determination is made as to whether any of the search terms is an approved term by referencing the search terms against a list of approved terms. If any of the search terms is an approved term, then that search term's corresponding entry in the list of approved terms is updated with that search term's associated popularity index.

The search terms that are not approved terms define a set of unclassified search terms. These unclassified search terms are classified by updating the list of approved terms to include the unclassified search terms and their associated popularity indices.

The most popular search terms in the list of approved search terms is determined based upon the popularity index. A webpage is generated including images associated with each of the most popular search terms.

In one embodiment, a determination is made as to whether any of the search terms is a non-approved term by referencing the search terms against a list of non-approved terms. The search terms that are neither approved terms nor non-approved terms thereby define the set of unclassified search terms. These unclassified search terms are classified by first determining each of the unclassified search terms to be either an approved term or a non-approved term. Then, if an unclassified term is determined to be a non-approved term, the list of non-approved terms is updated to include that unclassified term. Whereas, if an unclassified term is determined to be an approved term, then the list of approved terms is updated to include that unclassified term and its associated popularity index.

In one embodiment, the method further includes operations of receiving a plurality of search queries, and analyzing the plurality of search queries to determine the plurality of search terms and associated popularity indices.

In another embodiment, the terms in the list of approved terms which are aliases of each other are organized in parent-child relationships. Hence, the classification operation further determines if an unclassified term which has been determined to be an approved term is an alias of an existing approved term, and if so, then the list of approved terms is updated so as to associate that unclassified term with the existing approved term in a parent-child relationship.

In one embodiment, for a given image included in the webpage, a link is embedded in the image which provides access to an internet search of the approved term associated with the given image.

In one embodiment, a size of the images of the most popular search terms included in the webpage decreases as the popularity index of the most popular search terms decreases.

In one embodiment, the generated webpage includes internet search results of one or more of the most popular search terms.

In one embodiment, the generated webpage includes news headlines related to one or more of the most popular search terms.

In another embodiment, a method for displaying popular internet searches on a webpage is provided. The method includes operations of receiving a plurality of search queries and analyzing plurality of search queries to generate popularity data. The popularity data includes a plurality of search terms, and each of the search terms has an associated popularity index. It is determined if any of the search terms is an approved term by referencing the search terms against a list of approved terms. If any of the search terms is an approved term, then that search term's corresponding entry in the list of approved terms is updated with that search term's associated popularity index. It is further determined if any of the search terms is a non-approved term by referencing the search terms against a list of non-approved terms.

The search terms that are neither approved terms nor non-approved terms define a set of unclassified search terms. These terms are determined to be either an approved term or a non-approved term. If an unclassified term is determined to be a non-approved term, then the list of non-approved terms is updated to include that unclassified term. And if an unclassified term is determined to be an approved term, then the list of approved terms is updated to include that unclassified term and its associated popularity index.

The most popular search terms in the list of approved search terms are determined based upon the popularity index. An image is associated with each of the most popular search terms. A webpage is generated including the images associated with the most popular search terms.

In various embodiments, the images may be pictures, photographs or videos.

In another embodiment, a system for presenting popular internet searches on a webpage is provided. The system includes a database of approved terms, wherein each of the approved terms has an associated image, as well as a database of unapproved terms. A filter is provided for receiving and filtering popularity data. The popularity data includes search terms, each of which have an associated popularity index. The filter determines if any of the search terms is an unapproved term by referencing the database of unapproved terms, and if so, discards that search term. The filter also determines if any of the search terms is an approved term by referencing the database of approved terms, and if so, updates the corresponding entry in the database of approved terms to include the popularity index associated with that search term in the popularity data.

A classifier is provided for classifying search terms which do not appear in either the database of unapproved terms or the database of approved terms. These search terms which do not appear in either the database of unapproved terms or the database of approved terms define a set of unclassified terms. The classifier enables an editor to determine each of the unclassified terms to be either an approved term or an unapproved term. If an unclassified term is determined to be an approved term, then the database of approved terms is updated to include that unclassified term and its associated popularity index. Whereas if an unclassified term is determined to be an unapproved term, then the database of unapproved terms is updated to include that unclassified term.

A publisher is provided for publishing an image associated with each of the most popular search terms in the database of approved terms to a webpage. The most popular search terms are those search terms in the database of approved terms having the highest popularity index values.

In one embodiment the system includes an internet search engine for receiving a plurality of search queries, and a search analyzer for analyzing the plurality of search queries to generate the popularity data.

In one embodiment, the terms in the database of approved terms which are aliases of each other are organized in parent-child relationships. And the classification includes determining if an unclassified term which has been determined to be an approved term is an alias of an existing approved term. If so, then the database of approved terms is updated to associate that unclassified term with the existing approved term in a parent-child relationship.

In one embodiment the images may be pictures, photographs and/or videos.

In one embodiment, the publishing is performed such that for a given image published to the webpage, an embedded link is provided to an internet search of the approved term associated with the given image.

In one embodiment, a size of the associated images of the most popular search terms included in the webpage decreases as the popularity index of the most popular search terms decreases.

In one embodiment, the publisher renders internet search results of one or more of the most popular search terms to the webpage.

In one embodiment, the publisher renders news headlines related to one or more of the most popular search terms.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe systems and methods for publishing popular internet searches to a web page. Databases of approved and non-approved terms are provided, which contain search terms that are approved or not approved for publication to a web page, respectively. Popularity data is provided which includes popular search terms and associated popularity indices, the popularity indices indicating a measure of popularity of the search terms. The popularity data is referenced against the databases of approved and non-approved terms. Popular search terms that are not found in either of the databases of approved and non-approved terms are classified, and entries added to the databases as needed. The database of approved terms is polled to determine the most popular search terms based on the popularity index. Images are associated with the most popular search terms, and the images are published to web page thus displaying the most popular search terms in visual form.

It will be obvious, however, to one skilled in the art, that the present invention may be practiced without some or all of these specific details. In other instances, well known process operations have not been described in detail in order not to unnecessarily obscure the present invention.

Figure 1:
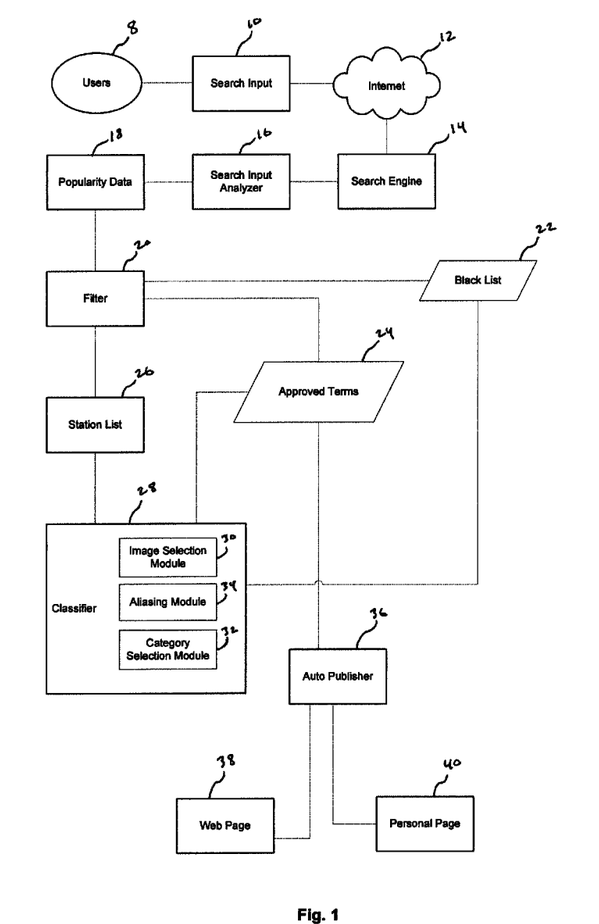
FIG. 1 illustrates a system for publishing popular internet searches to a web page, in accordance with an embodiment of the invention.

With reference to FIG. 1, a system for publishing popular internet searches to a web page is shown. An internet search engine 14 is connected to the internet 12, and receives user input 10. A search engine will be generally understood by those skilled in the art as a system which assists users in searching for content on the internet. A typical search engine receives a user inputted search query, and returns search results in the form of addresses/links to relevant internet content. The content usually comprises web pages, though a search engine may assist a user in searching for other types of content such as audio, video, and other types of files which are accessible over the internet. A typical search engine operates by first examining internet content and then indexing the content by storing information about it in databases for later retrieval. Information such as key words found in the content may be utilized for indexing purposes. Thus, when a user inputs certain key words in a search query, then the search engine may retrieve the addresses of content containing the same or similar key words. Automatic software modules known as crawlers or spiders may be employed to automatically access and analyze available internet content.

The search engine 14 thus indexes content available over the internet 12, as well as receives search input 10 from users 8 accessing the search engine 14 over the internet 12. The search input 10 generally consists of search queries which are submitted by users 8 of the search engine 14. These search queries contain search terms which may consist of one or more words. The search engine 14 returns search results to the users 8 based on their search queries, but also stores the submitted search input 10 for later analysis.

Periodically, the search input 10 is analyzed by search input analyzer 16 to determine popularity data 18. In one embodiment, the search input 10 is analyzed by search input analyzer 16 once per day. In other embodiments, the search input 10 is analyzed more frequently or less frequently than once per day. The search input analyzer 16 determines popular search terms based on an analysis of the search input 10. Various methods may be employed to determine popular search terms without departing from the scope of the present invention.

In one embodiment, the popular search terms are determined based on the number of searches made for each search term, such that search terms having the most searches in a given time period are the popular search terms. In another embodiment, the popular search terms are determined based on a comparison of the number of searches for a given search term in the current time period with the number of searches for that search term over the previous time period. By way of example, search terms exhibiting the largest positive differential between the previous period and current period may be considered to be popular search terms.

In another embodiment, a measure of a rate of change in the number of searches for a given search term is utilized to determine the popular search terms. For example, a popularity determination may be based on the percentage increase in searches of a given search term. Thus, a search term may have a relatively low number of searches, but be determined to have a high popularity due to a large percentage increase in the number of searches as compared to the previous time period. In other embodiments, the rate of change in the number of searches for a given search term may be calculated for several subdivisions of the relevant time period, and popularity be determined based on the trend in the rate of change.

In still other embodiments, a popularity index is calculated for each search term. The popularity index is a measure of the popularity of a search term, and may be calculated by utilizing one or more of the previously described methods of determining popularity, alone or in combination, or other statistical methods as are known in the art for ascertaining popularity. As such, the popularity index may be based on sheer volume of searches, a measure of a rate of change in the number of search queries for a given term, and other such measures of popularity.

The popularity index may incorporate multiple data analysis methods in order to yield a single final number which constitutes the popularity index for a given search term. In some embodiments, multiple different data analysis methods may be assigned different weightings so as to produce an overall measure of the popularity of a search term which is influenced to varying degrees by the different data analysis methods. The popularity index may have an arbitrary scale, or utilize any of various scale types which are known in the art, such as linear or logarithmic. The popularity index may have a naturally determined valuation, or may be normalized to any particular scale desired. For ease of reference within the presently described embodiments, it will be assumed that a higher popularity index signifies greater popularity. However, it is recognized that in other embodiments, a lower popularity index may signify greater popularity.

The popularity data 18 thus includes a list of popular search terms, along with a measure of each search term's popularity, such as a popularity index. The popularity data 18 is analyzed by a filter 20, which categorizes each given search term of the popularity data 18. The filter 20 references a black list 22, which is a list or database of non-approved terms, to determine if any of the search terms of popularity data 18 are found on the black list. If so, then that term is discarded. The black list 22 contains search terms which are not approved for publishing. These may be terms that are deemed unsuitable for publishing for any number of reasons, such as obscenity, vulgarity, slander, pornographic reference or any other reasons which may cause a search term to be inappropriate for publication purposes.

The filter 20 also references a list of approved terms 24, which contains a list or database of search terms that are approved for publishing. Each approved search term in the list of approved terms 24 is also capable of having a popularity index, a category, and an image associated with it. Moreover, in one embodiment, alias search terms within the list of approved terms are organized in parent-child relationships. An alias search term will be understood by those skilled in the art as a term which, though distinguishable from another alias on the basis of its text string, in fact has the same meaning or significance as the other. Hence, search terms which are aliases of each other may be organized as children which are configured to have the same parent search term.

If a search term from the popularity data 18 is found in the approved terms database, then that search term's corresponding entry in the list of approved terms 24 is updated to include the relevant popularity index or other measure of popularity from the popularity data 18.

If a search term from the popularity data 18 is determined to be neither on the black list 22, nor the list of approved terms 24, then that search term and its associated popularity index are added to the station list 26. The station list 26 contains search terms that have yet to be classified as either approved terms or non-approved terms. A classifier 28 enables an editor to determine whether a search term on the station list should be classified as an approved term or a non-approved term. If a given search term is deemed to be a non-approved term, then the term is added to the black list 22. Whereas, if a search term on the station list 26 is determined to be an approved term, then the search term is added to the list of approved terms 24, along with its associated popularity index.

In accordance with an embodiment of the invention, the classifier 28 includes an image selection module 30. The image selection module 30 enables an editor to select an image to be associated with a given search term. The images may be drawn from various sources, such as an image bank, which may be available locally or via a network such as the internet. The images may comprise pictures, photographs, videos, or other types of still or moving images. An editor may determine the particular parameters of the image to be associated with the search term, such as size, shape, aspect ratio, etc. The image associated with a new search term is included when the search term is added to the list of approved terms 24. In one embodiment, the image selection module automatically assigns an initial image to a given search term. An editor then has the option of adjusting the pre-selected image or selecting a different image.

In accordance with an embodiment of the invention, the classifier 28 includes a category selection module 32. The category selection module 32 enables an editor to specify a category for a search term that is to be added to the list of approved terms 24. Examples of categories include entertainment, celebrities, sports, music, news, etc. The category designation associated with search terms in the list of approved terms 24 enables an additional level of specificity, as the most popular search terms may be selected for a particular category, as discussed in further detail below. In one embodiment, the category selection module automatically assigns an initial category to a given search term. An editor then has the option of selecting a different category as desired. In another embodiment, multiple categories may be selected for a search term, as it may be the case that a given search term is relevant to more than one category.

Furthermore, in accordance with an embodiment of the invention, the classifier 28 includes an aliasing module 34. The aliasing module 34 enables an editor to determine if a new search term from the station list 26 should be classified as an alias of an existing search term or as an entirely new search term in the list of approved terms 24. If the new search term should be classified as an alias of an existing term, then the aliasing module 34 allows for insertion of the new term in various ways depending upon the nature of the existing term and the desired classification of the new term.

Where the existing term is part of an existing parent-child group of alias search terms, then the new search term may be entered as a new child entry to the existing group; or it may be added as the parent of the existing group, in which case the existing parent is changed to be a child within the group. If the new search term is determined to be an alias of an existing term, but the existing term is not part of an alias group, then the new term may be inserted as either the child or the parent of the existing term. In such a case, then the existing term would be designated as the corresponding parent or child of the new search term.

If the new search term is deemed to be an entirely new search term which is not an alias of an existing term, then the new search term may be added to the list of approved terms 24 as a new search term without being designated as a parent or child. In each of the foregoing scenarios for entry of a new search term into the list of approved terms 24, the new search term's associated popularity index, image, and category are added to its entry within the list of approved terms 24.

An auto publisher 36 periodically polls the list of approved terms 24 to determine the most popular search terms. The most popular search terms are determined by detecting the search terms in the list of approved terms 24 that have the highest associated popularity index. In various embodiments, the number of the most popular search terms may vary. In one embodiment, the ten most popular search terms are determined. In other embodiments, the number of the most popular search terms may be less than ten or more than ten.

Furthermore, in various embodiments, the frequency with which the auto publisher 36 polls the list of approved terms 24 to determine the most popular search terms may vary. In one embodiment, the auto publisher 36 polls the list of approved terms 24 approximately once per day. In other embodiments, the auto publisher 36 polls the list of approved terms 24 more or less frequently than once per day. In one embodiment, the auto publisher 36 is synchronized with the input of popularity data 18, such that it polls the list of approved terms 24 as often as new popularity data 18 is provided to the system.

In one embodiment, the auto publisher 30 additionally polls the list of approved terms 24 to determine the most popular search terms within one or more of the permissible categories. This is performed by determining within each category the search terms having the highest popularity index. In this manner, a more specific listing of the most popular search terms which is tailored to a particular category may be provided by the auto publisher 30.

The auto publisher 36 then publishes the most popular search terms to a web page 38. Various "push" or "pull" technologies as are known in the art may be employed to publish the most popular search terms to web page 38, without departing from the scope of the present invention. In one embodiment, the auto publisher publishes the images associated with each of the most popular search terms to the web page 38. In this manner, a user that is browsing the web page 38 may experience a visual representation of the most popular searches received by the search engine 14. By providing such a visual representation, it is possible for a user with no knowledge of a particular most popular search term to at a glance gain some understanding of the possible meaning of the search term. In one embodiment, the text of the most popular search terms is overlaid onto the corresponding images which are published to the web page 38. The text may include a numerical ranking indicating the relative popularity of the search term amongst the determined most popular search terms.

In various embodiments of the invention, different arrangements of the images associated with the most popular search terms may be applied to enhance a user's experience. For example, the images may be displayed on the web page 38 in such a manner that the size of the image displayed for each of the most popular search terms generally decreases as the relative popularity of the search term decreases. The images may be displayed as one continuous "collage" of images, or be separately displayed.

Additionally, the displayed images on the web page may contain embedded hyperlinks and so are clickable by a user. In various embodiments, the embedded hyperlinks may cause results which relate to the search term which corresponds to the image. For example, clicking on a given image may redirect the user to the results web page of an internet search for the corresponding search term by the search engine 14. Or in another embodiment, clicking on a given image may produce news headlines relating to the corresponding search term.

In accordance with one embodiment, a user of the search engine 14 may have a personal web page 40. The auto publisher 36 thus additionally functions to publish the most popular search terms and/or their associated images to the personal page 40. In one embodiment, in order to facilitate use of the most popular search terms as determined by the auto publisher 36, the user's personal page 40 may include code or an applet that is specialized for receiving the most popular search terms and their associated images from the auto publisher 36.

With reference to FIGS. 2A-E, an example illustrating techniques and principles in accordance with embodiments of the invention is shown. At FIG. 2A, popularity data 50 is shown. The popularity data 50 includes search terms and an associated popularity index for each of the search terms. The search terms and popularity index values are given by way of example only and provided for illustrative purposes. As shown, the search term "Jill Star" has the highest popularity index of 10, and is therefore the most popular of the search terms in the popularity data 50; whereas the search term "JS" has the lowest popularity index of 3, and is consequently considered the least popular within the popularity data 50.

Figure 2A:
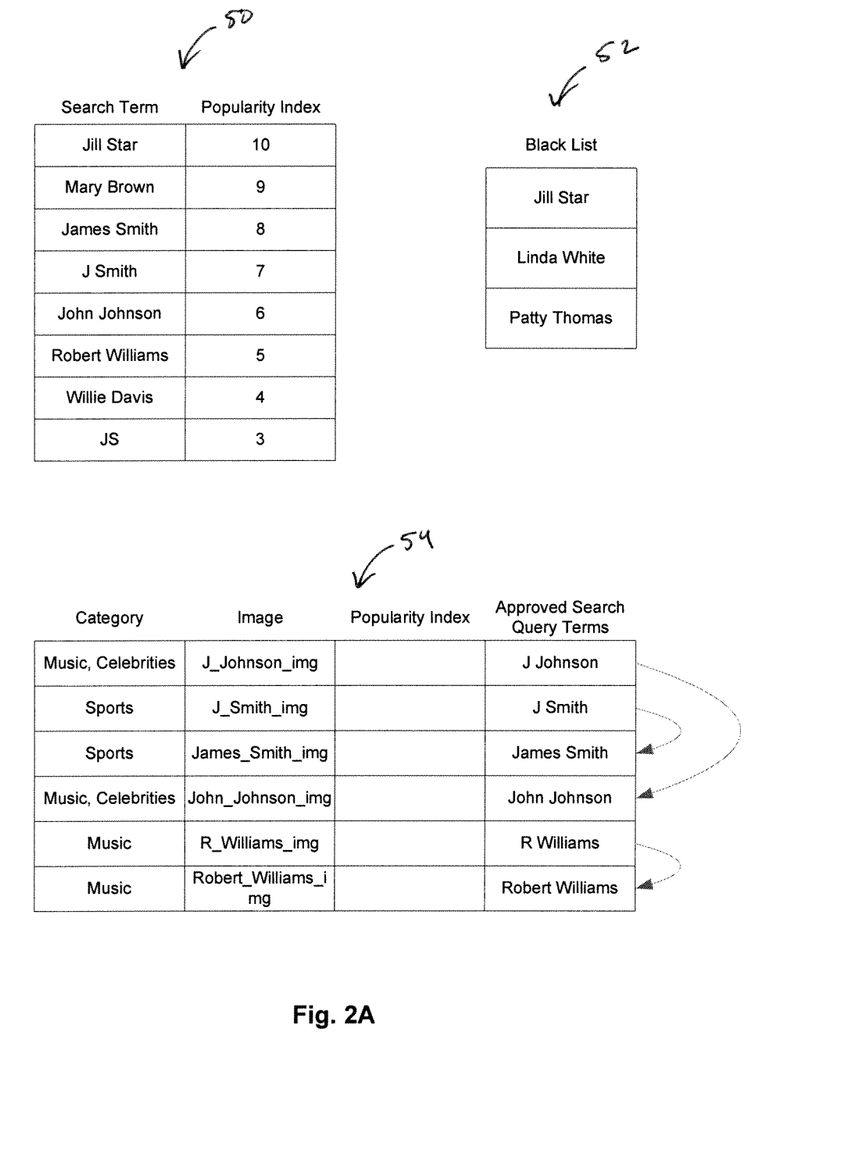
FIGS. 2A-E show an example of popularity data and various search term data structures, illustrating techniques and principles in accordance with embodiments of the invention.

A black list 52 is provided, which contains search terms that are not approved for publication. If a search term in the popularity data 50 appears on the black list 52, then that search term is discarded from consideration. As can be seen, the term "Jill Star," which appears in the popularity data 50, also appears on the black list 52. Therefore, "Jill Star" is discarded from consideration because the term is not approved for publication.

Also, a list of approved search terms 54 is provided which contains search terms that are approved for publication. The list of approved terms includes approved search terms as well as images associated with the approved search terms, designated categories for the search terms, and an allocation for associating a popularity index with each of the approved search terms. Furthermore, approved search terms which are aliases of each other may be designated as parents or children of one another. As shown, the term "J Johnson" is a child of the parent term "John Johnson," whereas the term "J Smith" is a child of the parent term "James Smith," while the term "R Williams" is a child of the parent term "Robert Williams."

If a search term in the popularity data 50 appears on the list of approved search terms 54, then the entry in the list of approved search terms is updated with the corresponding popularity index from the popularity data 50. As shown, the terms "J Smith," "James Smith," "John Johnson," and "Robert Williams," which are included in the popularity data, also appear on the list of approved terms 54. Therefore, as illustrated at FIG. 2B, these entries in the list of approved terms 54 are updated to include the corresponding popularity indices from the popularity data 50.

Figure 2B:
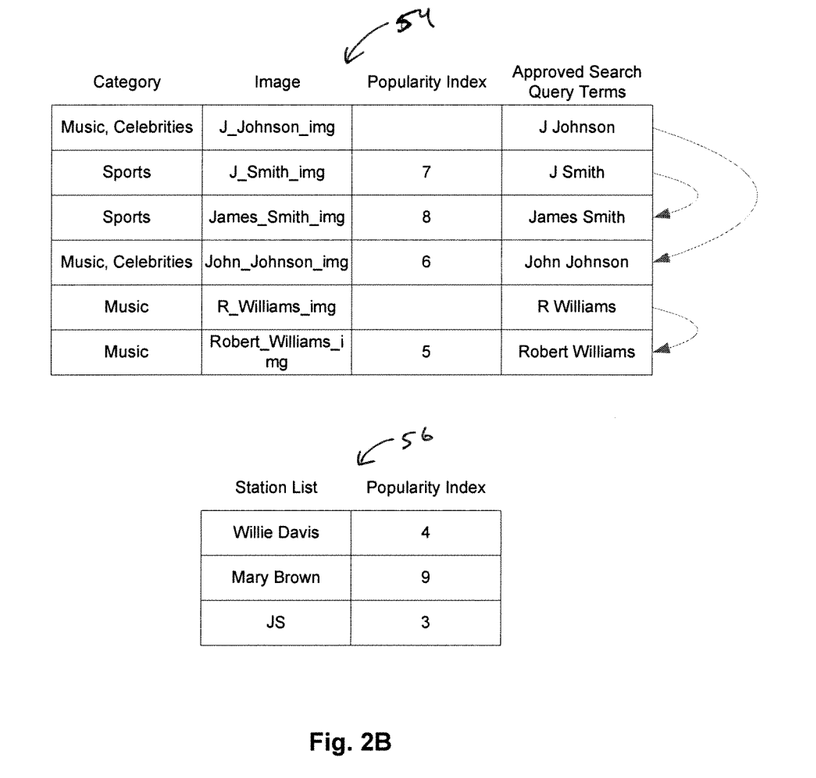

With continued reference to FIG. 2B, a station list 56 is shown. The terms that are not found on the black list 52 or the list of approved search terms 54 are added to the station list 56, along with their popularity indices. Thus, as shown, the search terms "Willie Davis," "Mary Brown," and "JS" have been added to the station list 56. The terms which are on the station list will be classified as either non-approved or approved terms, and added to either the black list 52 or the list of approved search terms 54.

Figure 2C:
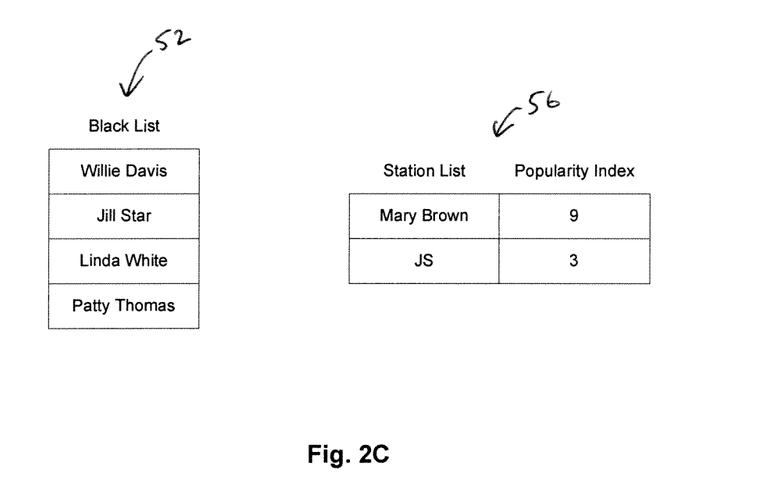

With reference to FIG. 2C, the search term "Willie Davis" has been determined to be a non-approved term. Therefore, the search term "Willie Davis" has been added to the black list 52.

Figure 2D:
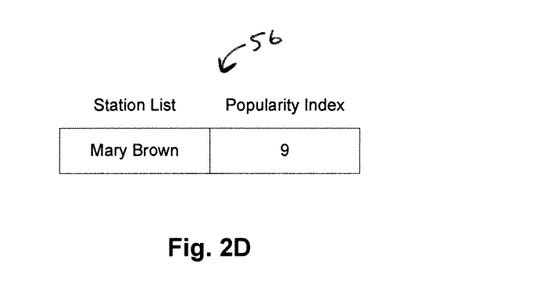

With reference to FIG. 2D, the search term "JS" has been determined to be an approved term. Therefore, an entry for "JS" has been created in the list of approved terms. An image has been selected for the search term "JS," as indicated by the file reference "JS_img." Additionally, the search term "JS" has been determined to be in the sports category. Also, it has been determined that "JS" is an alias of the term "James Smith." Therefore, "JS" is incorporated into the list of approved search terms 54 as a child term of the parent term "James Smith."

Figure 2E:
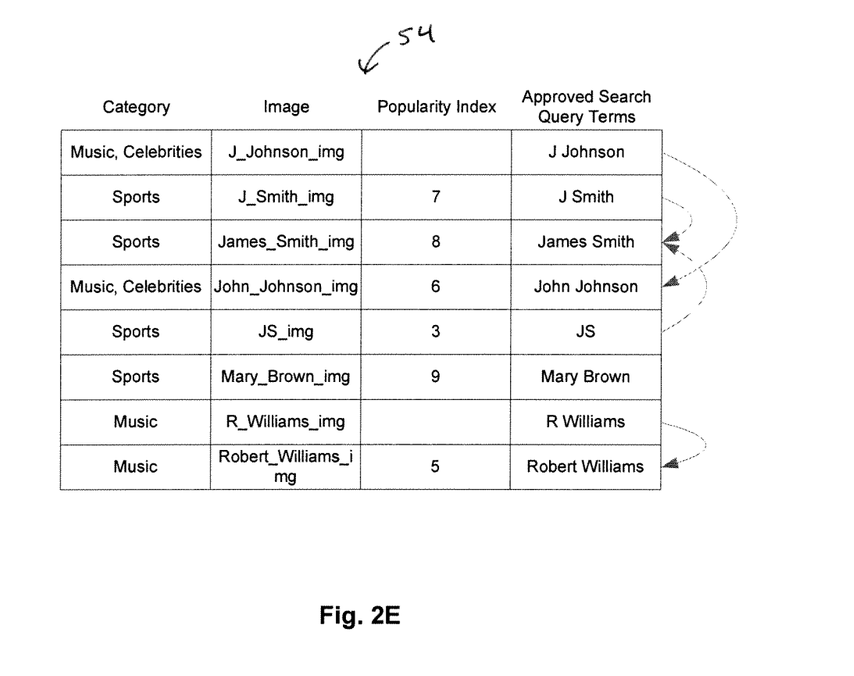

With reference to FIG. 2E, the term "Mary Brown" has been determined to be an approved term, and is therefore added to the list of approved search terms 54. A new entry is created in the list of approved search terms 54 for the term "Mary Brown," which includes the corresponding popularity index from the popularity data 50. Additionally, an image is selected for the term "Mary Brown," as indicated by the file reference "Mary_Brown_img." And the search term "Mary Brown" has been determined to be of the sports category.

The results of applying the popularity data 50 are illustrated by the list of approved search terms 54 as shown at FIG. 2E. As shown, the term "Mary Brown" has the highest popularity index, and is therefore the most popular search term when considering the search terms on an individual basis. However, it may also be desirable to consider the combined popularity index of groups of aliased search terms when determining the most popular search terms. In the presently illustrated example, the parent term "James Smith" has child terms "J Smith" and "JS." By way of example, and in accordance with one embodiment of the invention, it may be possible to determine the cumulative popularity index of multiple popularity indices by summing the multiple popularity indices. Therefore, the total popularity index of the "James Smith" alias group can be determined by summing the popularity indices of "James Smith," "J Smith," and "JS." This yields a popularity index of 18 for the alias group, which is greater than the popularity index for the term "Mary Brown" (9). Thus, by considering the cumulative popularity index of alias groups, the most popular search term may be determined to be different than would be the case when considering search terms individually.

Additionally, the most popular search terms may be determined for each category. In the example illustrated at FIG. 2E, the search term "John Johnson" has the highest popularity index for search terms in the music category. Whereas, the search term "Mary Brown" has the highest popularity index in the sports category. However, as discussed above, the cumulative popularity index of the "James Smith" alias group (18), which is also categorized in the sports category is greater than the popularity index of the term "Mary Brown." Thus, the determination of the most popular search terms within a given category may depend in part on whether or not one considers the cumulative popularity index of alias groups of search terms.

Figure 3:
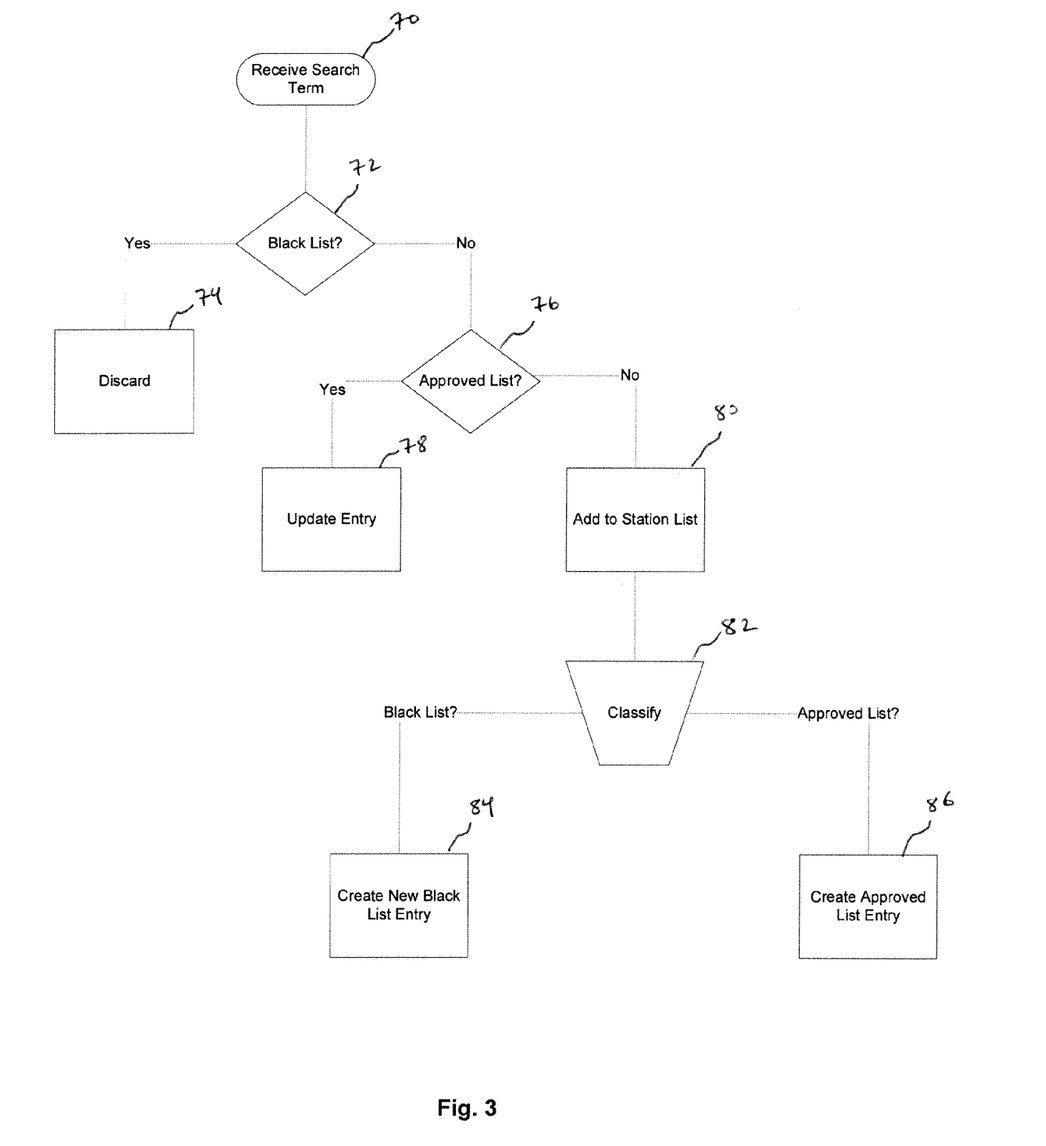
FIG. 3 illustrates a method for classifying a search term, in accordance with an embodiment of the invention.

With reference to FIG. 3, a method for classifying a search term consisting of a number of method operations is illustrated. At method operation 70, a search term having associated data such as a popularity index is received for consideration. At method operation 72, it is determined whether the search term is on a black list of search terms. The black list of search terms is a list of search terms that are not approved for publication. If the search term is on the black list, then at method operation 74, the search term is discarded from consideration. However, if the search term is not on the black list, then it is determined at method operation 76 whether or not the search term is on an approved list of search terms. The approved list of search terms is a list of search terms that are approved for publication. If the search term is found on the approved list of search terms, then at method operation 78, the entry of the search term in the approved list of search terms is updated with the search term's associated data, which may include a popularity index.

However, if the search term is not found on the approved list of search terms, then at method operation 80, the search term is added to a station list. The station list contains search terms that not found on either the black list or the approved list of search terms. At method operation 82, the search term is taken from the station list and it is determined whether the search term should be added to the black list or to the approved list of search terms. If it is determined that the search term should be added to the black list, then at method operation 84, a new entry is created in the black list for the search term. However, if it is determined that the search term should be added to the approved list, then at method operation 86, a new entry is created in the approved list for the search term along with its associated data.

Figure 4:
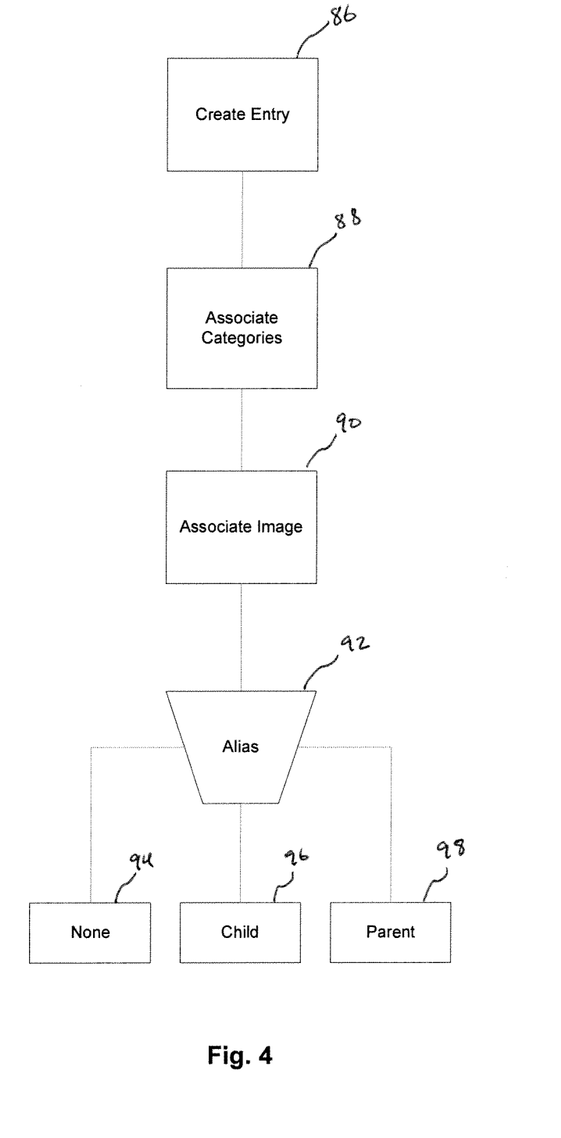
FIG. 4 illustrates a method for classifying a search term in an approved list of search terms, in accordance with an embodiment of the invention.

With reference to FIG. 4, a method for classifying a search term in an approved list of search terms is illustrated. At method operation 86, a new entry is created in the approved list for the search term. At method operation 88, one or more categories are designated for the search term, and these are associated with the search term entry in the approved list. The categories as applied to the approved list of search terms are useful for grouping search terms that are of a similar kind or type, and enable more selective data based on the categories to be extracted from the approved list.

At method operation 90, an image is selected for the search term, and this image is associated with the search term entry in the approved list. The image may be associated by including a file reference in the approved list of search terms to an image data file which may be locally or remotely stored.

At method operation 92, it is determined whether the search term is an alias of an existing search term within the approved list of search terms. If the search term is determined to not be an alias of an existing term, then at method operation 94, the search term entry in the approved list is designated as having no alias. However, if the search term is determined to be an alias of an existing term in the approved list, then it is determined whether the search term should be a child or parent of an existing term. If the search term is determined to be a child of an existing term, then at method operation 96, the search term is designated as a child of the existing term. If the existing term is not already a parent term, then the existing term is also designated as a corresponding parent term. Whereas, if the search term is determined to be parent of an existing term, then at method operation 98, the search term is designated as a parent of the existing term. If the existing term is not already a child term, then the existing term is also designated as a corresponding child term.

Figure 5:
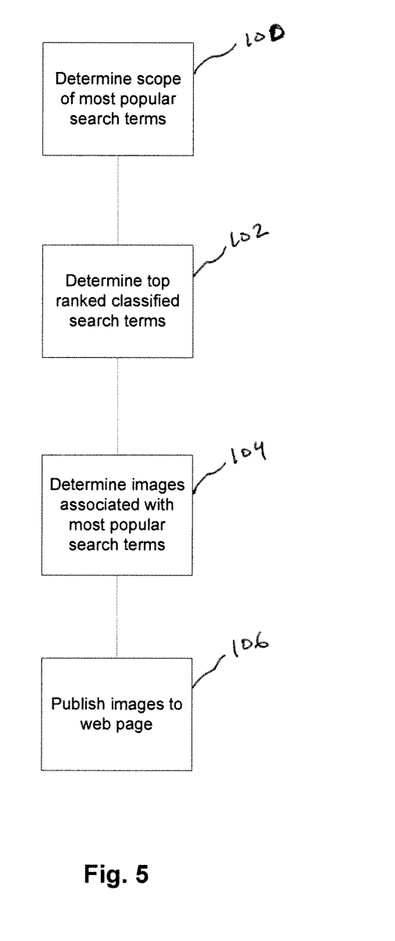
FIG. 5 illustrates a method for presenting a selection of the most popular search terms on a web page, in accordance with an embodiment of the invention.

With reference to FIG. 5, a method for presenting a selection of the most popular search terms on a web page is illustrated. The search terms which are considered are contained in an approved list of search terms. The approved list also includes category designations, a measure of popularity, such as a popularity index, and images which are associated with the search terms. At method operation 100, the scope of a determination of most popular search terms is determined. This is based on selection of one or more categories, which limits the scope of the determination to those search terms in the approved list which have the selected categories associated with them. It is also possible to select all of the search terms within the approved list of terms, in which case the scope of the determination includes all search terms regardless of category in the approved list.

At method operation 102, the most popular search terms in the approved list are determined in accordance with the scope determined at method operation 100. In one embodiment, the most popular search terms are determined by selecting the terms in the approved list of the appropriate category which have the highest popularity index. In other embodiments, the most popular search terms are determined in accordance with the characteristics of the popularity index or measure of popularity being used to gauge popularity of a search term.

At method operation 104, the images associated with the most popular search terms are selected. And at method operation 106, the images associated with the most popular search terms are published to a web page.

Figure 6:
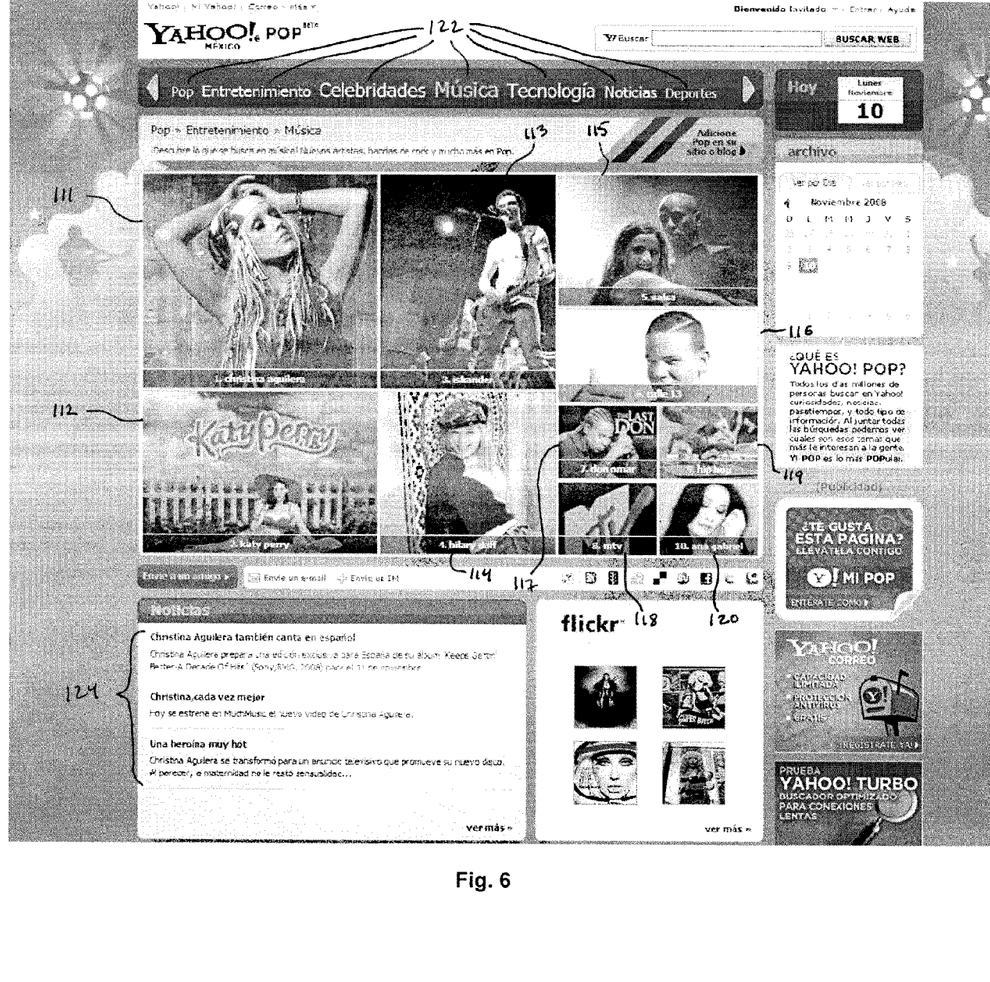
FIG. 6 illustrates a web page displaying the most popular searches for a category, in accordance with an embodiment of the invention.

With reference to FIG. 6, a web page displaying the most popular searches for a category is illustrated, in accordance with an embodiment of the invention. The ten most popular searches are shown as images 111-120. For each of the images 111-120, a numeral indicating ranking, and the text of the relevant search term is overlaid onto the display of the image. Image 111 as shown represents the most popular search term, and is therefore shown as the largest image.

Images 112 and 113 represent the second and third most popular search terms, and are therefore smaller than image 111. Image 114 represents the fourth most popular search term, and is displayed smaller than images 112 and 113. Likewise, images 115 and 116, which represent the fifth and sixth most popular search terms, are shown smaller than the higher ranked images. And images 117 to 120, which represent the lowest ranked search terms, are shown as the smallest of the images.

As illustrated, the size of the image representing the search term generally decreases as the ranking of the search term decreases. By way of example only, and in accordance with one embodiment, the images 112 and 113 are approximately equivalent in size, where as images 115 and 116 are approximately equivalent in size. Also, images 117 to 120 are approximately equivalent in size. The arrangement and sizes of the images 111 to 120 are provided by way of example only, as it is recognized that other arrangements and sizes may be utilized without departing from the scope of the present invention.

Additionally, each of the images 111 to 120 contains an embedded hyperlink to a web search for the search term represented by the image. Thus, when a user clicks on one of the images, the user is redirected to a web search page which displays results of the web search for the particular search term represented by the image.

The web page shown at FIG. 6 includes a number of categories 122, which are used to specify the category of the most popular search terms which are represented by images 111 to 120. As shown, the categories 122 include "popular," "entertainment," "celebrities," "music," "technology," "news," and "sports." By clicking on one of the categories 122, then the images 111 to 120 displayed will represent the most popular search terms in the selected category. When the "popular" category is selected, then the images 111 to 120 represent the most popular search terms overall, regardless of category. In the example illustrated at FIG. 6, the "music" category has been selected, and thus the images 111 to 120 represent the most popular search terms in the "music" category.

Recent news headlines pertaining to the most popular search term, as indicated by image 111, are shown in the news section 124. The news headlines include embedded hyperlinks which when selected will redirect the user to the full news article. Thus, the news section 124 provides the user with easily accessible content relating to the most popular search term, and the ability to find out further detail regarding current news.

Figure 7:
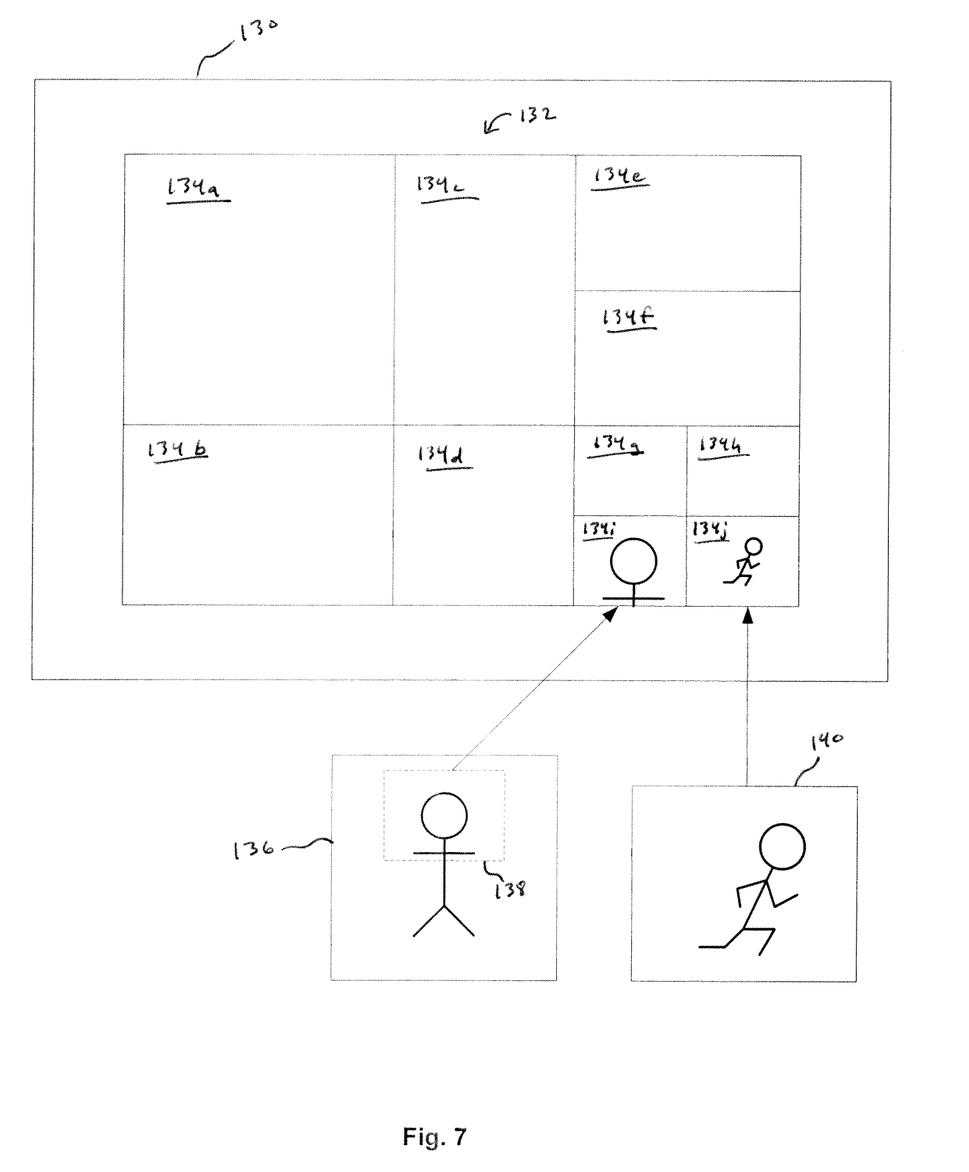
FIG. 7 illustrates a web page constructed by utilizing an image template, in accordance with an embodiment of the invention.

With reference to FIG. 7, a web page 130 is shown, illustrating techniques in accordance with an embodiment of the invention. The web page 130 is constructed by utilizing an image template 132. The image template 132 is a predetermined framework according to which images associated with the most popular search terms are presented on the webpage 130. The image template 132 includes image frames 134*a* to 134*j*, which are specified locations within the image template 132 in which images may be placed. Each image frame determines the size and aspect ratio of the image which will be presented within that image frame.

The image frames 134*a* to 134*j* as shown have different sizes which may be utilized to present images at different sizes depending upon the relative popularity of the search terms to which the images are associated. In other words, the image frames 134*a* to 134*j* are utilized such that an image associated with a more popular search term may be displayed larger than an image associated with a less popular search term. In other embodiments of the invention, the relative sizes of the image frames of the image template 132 may be varied to suit the particular relative sizing of images which is desired for presentation purposes.

Furthermore, the image frames 134a to 134j as shown are generally square or rectangular in shape. However, it is recognized that in other embodiments, the shapes of the image frames may be any other shape, such as polygonal, circular, etc.

It will be appreciated that images which are to be presented via the image template 132 may not be appropriately sized or proportioned to fit a particular image frame within the template 132. By way of example, an image 136 is shown being presented in image frame 134i of the image template 132. The image 136 is larger than the image frame 134i, and must be altered in order to be appropriately shown in the image frame 134i. Therefore, a cropped portion 138 of the image 136 having the appropriate size and aspect ratio is presented in the image frame 134i. In one embodiment, the particular cropped portion 138 may be selected manually. In another embodiment, the cropped portion 138 is automatically selected by utilizing a subject detection process, such as a facial recognition process. In this manner, the cropping of an image in order to fit the particular size or aspect ratio of a given image frame is achieved while presenting a desirable portion of the image in the image frame.

In another example, an image 140 is shown being presented in the image frame 134j. The image 140 is too large to be presented directly within the image frame 134j, and therefore must be altered. In this case, the size of the image 140 is reduced so as to fit within the image frame 134j. In one embodiment, the resizing of the image 140 may be accomplished by resampling the image 140 at a lower resolution. In other embodiments, a combination of resizing and cropping may be utilized to enable presentation of an image in a particular image frame of the image template 132.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g. a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable medium. The computer readable medium may be any data storage device that can store data, which can thereafter be read by a computer system. Examples of the computer readable medium include hard drives, network attached storage (NAS), read-only memory, random-access memory, FLASH based memory, CD-ROMs, CD-Rs, CD-RWs, DVDs, magnetic tapes, and other optical and non-optical data storage devices. The computer readable medium can also be distributed over a network coupled computer systems so that the computer readable code may be stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for generating a webpage having content based on popular internet search terms, the method comprising:

receiving popularity data, the popularity data including a plurality of search terms, each of the search terms having an associated popularity index, the popularity index for a given search term being based upon a measure of a rate of change in a number of search queries for the given search term by a plurality of users;

determining if any of the search terms is an approved term by referencing the search terms against a list of approved terms, and if any of the search terms is an approved term, then updating that search term's corresponding entry in the list of approved terms with that search term's associated popularity index;

classifying the search terms that are not approved terms, the search terms that are not approved terms defining a set of unclassified search terms, the classifying comprising updating the list of approved terms to include the unclassified search terms and their associated popularity indices;

determining the most popular search terms in the updated list of approved search terms based upon the popularity index; and generating a webpage including images associated with each of the most popular search terms, wherein generating the webpage includes displaying the images in predefined image frames of different sizes based on the popularity index of the images' corresponding search terms, wherein images associated with search terms having a higher popularity index are displayed in larger image frames than images associated with search terms having a lower popularity index, and wherein displaying a particular image in one of the predefined image frames includes detecting a subject in the particular image and cropping the particular image based on the detected subject;

wherein terms in the list of approved terms which are aliases of each other are organized in parent-child relationships;

wherein the classifying further comprises determining if an unclassified term which has been determined to be an approved term is an alias of an existing approved term, and if so, then updating the list of approved terms to associate that unclassified term with the existing approved term in a parent-child relationship.

2. The method of claim 1, further comprising, determining if any of the search terms is a non-approved term by referencing the search terms against a list of non-approved terms;

wherein the classifying further comprises,
classifying the search terms that are neither approved terms nor non-approved terms, the search terms that are neither approved terms nor non-approved terms defining the set of unclassified search terms,
determining each of the unclassified search terms to be either an approved term or a non-approved term,
if an unclassified term is determined to be a non-approved term, then updating the list of non-approved terms to include that unclassified term,
if an unclassified term is determined to be an approved term, then updating the list of approved terms to include that unclassified term and its associated popularity index.

3. The method of claim 1, further comprising,
receiving a plurality of search queries;
analyzing said plurality of search queries to determine said plurality of search terms and associated popularity indices.

4. The method of claim 1, wherein the generating a webpage further comprises,
for a given image included in said webpage, embedding a link to an internet search of the approved term associated with the given image.

5. The method of claim 1, wherein the generating a webpage further comprises,
rendering internet search results of one or more of the most popular search terms.

6. The method of claim 1, wherein the generating a webpage further comprises,
rendering news headlines related to one or more of the most popular search terms.

7. A computer program product for displaying content based on popular internet searches on a webpage, the computer program product embodied on a computer readable medium, comprising:

program instructions for receiving a plurality of search queries from a plurality of users;

program instructions for analyzing said plurality of search queries to generate popularity data, the popularity data including a plurality of search terms, each of the search terms having an associated popularity index;

program instructions for determining if any of the search terms is an approved term by referencing the search terms against a list of approved terms, and if any of the search terms is an approved term, then updating that search term's corresponding entry in the list of approved terms with that search term's associated popularity index;

program instructions for determining if any of the search terms is a non-approved term by referencing the search terms against a list of non-approved terms;

program instructions for classifying the search terms that are neither approved terms nor non-approved terms, the search terms that are neither approved terms nor non-approved terms defining a set of unclassified search terms, the classifying comprising,
determining each of the unclassified search terms to be either an approved term or a non-approved term,
if an unclassified term is determined to be a non-approved term, then updating the list of non-approved terms to include that unclassified term,
if an unclassified term is determined to be an approved term, then updating the list of approved terms to include that unclassified term and its associated popularity index;

program instructions for determining the most popular search terms in the list of approved search terms based upon the popularity index;

program instructions for associating an image with each of the most popular search terms;

program instructions for generating a webpage including the images associated with the most popular search terms, wherein generating the webpage includes displaying the images in predefined image frames of different sizes based on the popularity index of the images' corresponding search terms, wherein images associated with search terms having a higher popularity index are displayed in larger image frames than images associated with search terms having a lower popularity index, and wherein displaying a particular image in one of the predefined image frames includes detecting a facial region in the particular image and cropping the particular image based on the detected facial region;

wherein terms in the list of approved terms which are aliases of each other are organized in parent-child relationships;

wherein the program instructions for classifying further comprises program instructions for determining if an unclassified term which has been determined to be an approved term is an alias of an existing approved term, and if so, then updating the list of approved terms to associate that unclassified term with the existing approved term in a parent-child relationship.

8. The computer program product of claim 7, wherein the images are selected from the group consisting of pictures, photographs and videos.

9. The computer program product of claim 7, wherein the program instructions for generating a webpage further comprises,
   for a given image included in said webpage, program instructions for embedding a link to an internet search of the approved term associated with the given image.

10. The computer program product of claim 7, wherein the program instructions for generating a webpage further comprises,
    program instructions for rendering internet search results of one or more of the most popular search terms.

11. The computer program product of claim 7, wherein the program instructions for generating a webpage further comprises,
    program instructions for rendering news headlines related to one or more of the most popular search terms.

12. A system for presenting content based on popular internet searches on a webpage, the system comprising
    a database of approved terms, each of the approved terms having an associated image;
    a database of unapproved terms;
    a filter for receiving and filtering popularity data, the popularity data including search terms, each of the search terms having an associated popularity index based on search queries by a plurality of users, the filter determining if any of the search terms is an unapproved term by referencing the database of unapproved terms, and if so, discarding that search term, and the filter determining if any of the search terms is an approved term by referencing the database of approved terms, and if so, updating the corresponding entry in the database of approved terms to include the popularity index associated with that search term in the popularity data;
    a classifier for classifying search terms which do not appear in either the database of unapproved terms or the database of approved terms, the search terms which do not appear in either the database of unapproved terms or the database of approved terms defining a set of unclassified terms, the classifier enabling an editor to determine each of the unclassified terms to be either an approved term or an unapproved term, such that if an unclassified term is determined to be an approved term, then updating the database of approved terms to include that unclassified term and its associated popularity index, whereas if an unclassified term is determined to be an unapproved term, then updating the database of unapproved terms to include that unclassified term;
    a publisher for publishing an image associated with each of the most popular search terms in the database of approved terms to a webpage, the most popular search terms being those search terms in the database of approved terms having the highest popularity index values, wherein the publisher publishes the images in predefined image frames of different sizes based on the popularity index of the images' corresponding search terms, wherein images associated with search terms having a higher popularity index are displayed in larger image frames than images associated with search terms having a lower popularity index, and wherein displaying a particular image in one of the predefined image frames includes detecting a subject in the particular image and cropping the particular image based on the detected subject, the cropping being configured to fit a size and aspect ratio defined by the one of the predefined image frames;
    wherein terms in the database of approved terms which are aliases of each other are organized in parent-child relationships; and
    wherein the classifying further comprises determining if an unclassified term which has been determined to be an approved term is an alias of an existing approved term, and if so, then updating the database of approved terms to associate that unclassified term with the existing approved term in a parent-child relationship.

13. The system of claim 12, further comprising
    an internet search engine for receiving a plurality of search queries;
    a search analyzer for analyzing said plurality of search queries to generate the popularity data.

14. The system of claim 12, wherein
    the images are selected from the group consisting of pictures, photographs and videos.

15. The system of claim 12, wherein the publishing further comprises
    for a given image published to said webpage, embedding a link to an internet search of the approved term associated with the given image.

16. The system of claim 12, wherein the publisher renders internet search results of one or more of the most popular search terms to the webpage.

17. The system of claim 12, wherein the publisher renders news headlines related to one or more of the most popular search terms.

18. The method of claim 1, wherein the image frames are arranged to define locations in a predetermined framework, the images being displayed at the locations based on the popularity index of the images' corresponding search terms.

19. The computer program product of claim 7, wherein the image frames are arranged to define locations in a predetermined framework, the images being displayed at the locations based on the popularity index of the images' corresponding search terms.

20. The system of claim 12, wherein the image frames are arranged to define locations in a predetermined framework, the images being displayed at the locations based on the popularity index of the images' corresponding search terms.

* * * * *